United States Patent [19]

Yonemitsu et al.

[11] 4,011,200
[45] Mar. 8, 1977

[54] NOVEL POLYPHENYLENE ETHER AND PROCESS FOR PREPARING THE SAME

[75] Inventors: Eiichi Yonemitsu, Kashiwa; Akitoshi Sugio, Omiya; Takao Kawaki, Tokyo, all of Japan

[73] Assignee: Mitsubishi Gas Chemical Co., Ltd., Japan

[22] Filed: Mar. 4, 1975

[21] Appl. No.: 555,129

[30] Foreign Application Priority Data

May 25, 1974  Japan ............................. 49-59197

[52] U.S. Cl. .......................................... 260/47 ET
[51] Int. Cl.² ........................................ C08G 65/44
[58] Field of Search ............................. 260/47 ET

[56] References Cited
UNITED STATES PATENTS

| | | | |
|---|---|---|---|
| 3,306,874 | 2/1967 | Hay | 260/47 ET |
| 3,306,875 | 2/1967 | Hay | 260/47 ET |
| 3,681,285 | 8/1972 | Naarmann | 260/47 ET |

*Primary Examiner*—Paul R. Michl
*Attorney, Agent, or Firm*—Wenderoth, Lind & Ponack

[57] ABSTRACT

A polyphenylene ether random copolymer excelling in heat resistance and resistance to solvents, said copolymer being composed of 50–98 mol% of a structural unit of the formula

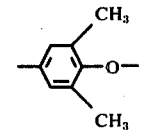

derived from 2,6-dimethyl phenol and 50–2 mol% of a structural unit of the formula

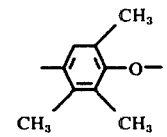

derived from 2,3,6-trimethylphenol, each of said structural units being randomly arranged in the polymeric structure, said copolymer having an intrinsic viscosity, as measured in chloroform at 25° C., of at least 0.3 dl/g.

12 Claims, No Drawings

NOVEL POLYPHENYLENE ETHER AND PROCESS FOR PREPARING THE SAME

FIELD OF THE INVENTION

This invention relates to a new polyphenylene ether and a process for preparing the same. More particularly, the invention relates to a new polyphenylene ether that is obtained by oxidatively coupling 2,6-dimethylphenol with 2,3,6-trimethylphenol. This new copolymer is characterized by the fact that it is superior to poly(2,6-dimethyl-1,4-phenylene) ether, the known homopolymer, especially in its resistance to solvents and heat resistance.

DESCRIPTION OF THE PRIOR ART

The synthetic polymers generically referred to as polyphenylene ethers demonstrate excellent thermal, mechanical and electrical properties and are thus known to be polymers capable of wide application. Hence, they are attracting attention as engineering plastics. In preparing such a polymer, known are such methods which consist of oxidatively coupling the phenols in the presence of oxygen or a substance that can liberated oxygen, using as catalyst a metal such as palladium or platinum, or a complex derived from the amines with at least one compound selected from the group consisting of the copper, manganese and cobalt compounds. In these known methods, as the phenols (in monomeric form), only monohydric phenols of a very limited range are being used, and in the case of the polyphenylene ethers, for the most part, commercial operations produce poly(2,6-diphenyl-1,4-phenylene) ether, while the poly(2,6-diphenyl-1,4-phenylene) ether is produced to a lesser extent. Thus is the state of the art. Hence, research concerning the polymerizability, the properties of the resulting polymers, etc., in the case of a wide range of monomeric phenols have not necessarily been carried out fully. Again, this also holds true in the case of the polyphenylene ether type copolymers. For example, in U.S. Pat. No. 3,306,875 there is disclosed in Example 14 a copolymer exclusively from the 2,6-di(lower alkyl) phenols, but there is no disclosures concerning the characteristics of this copolymer. Again, while there is disclosed in U.S. Pat. No. 3,257,357 a polyphenylene ether copolymer derived from a 2,6-di(lower alkyl) phenol with a 2,6-dihalophenol, there is only disclosed a method employing the pseudo-Ullmann reaction. Thus, as apparent from these examples, it is no exaggeration to say that the polyphenylene ether copolymers known from the prior art are only those exclusively from the 2,6-di-substituted phenols.

SUMMARY OF THE INVENTION

With a view to expanding the prior art methods of preparing a polymer by the oxidative coupling of single monomeric phenols and discovering a new method of synthesizing copolymers as well as finding a copolymer possessing superior properties, we have furthered our research concerning methods of preparing a new polyphenylene ether by copolymerizing monomers of different classes. Heretofore, the oxidative coupling of phenols for preparing the polyphenylene ethers has been said to proceed by a successive reaction that falls within the category of the radical polymerization type. However, it is known that in the oxidative coupling reaction of phenols, a difference in the nature of the substituent of the monomeric phenol makes a great difference in the polymerizability of the phenol, with the consequence that extreme difficulty is experienced in the choice of the monomers when copolymerizing monomeric phenols of different classes. This will be specifically described. For instance, according to the method of oxidatively coupling phenols disclosed in U.S. Pat. No. 3,306,875 the 2,6-dihalophenols are non-polymerizable. As a consequence, the homo- and copolymers of polyphenylene ethers having structural units derived from 2,6-dihalophenols must be prepared by a process in accordance with the pseudo-Ullmann reaction which comprises reacting the phenols as an alkali metal salt by adding to a monomeric phenol having halogen in the 4-position (such as disclosed in U.S. Pat. Nos. 3,257,357 and 3,257,358) an equimolar quantity thereof of an alkali hydroxide. Further, 2,3,6-trimethylphenol cannot be converted by the method disclosed in U.S. Pat. No. 3,306,875 to a polyphenylene ether having a high molecular weight such as specified in said patent.

It is therefore an object of this invention to provide a new polyphenylene ether copolymer. Another object is to provide a process whereby 2,6-dimethylphenol and 2,3,6-trimethylphenol are copolymerized by oxidative coupling. A further object is to provide a random copolymer derived from 2,6-dimethylphenol with 2,3,6-trimethylphenol. Other objects and advantages of the present invention will become apparent from the following description.

In consequence of our extensive research and technical assessments concerning the copolymerizability of 2,6-dimethylphenol with the other monomeric phenols as well as the properties of the resulting polyphenylene ether type copolymers, we found that the combination of 2,3,6-trimethylphenol and 2,6-dimethylphenol possess properties making them polymerizable.

That 2,3,6-trimethylphenol and 2,6-dimethylphenol possess the capability of being polymerizable can be understood from our finding that the reaction speed of the oxidative coupling of the individual monomeric phenols is substantially the same, though that of 2,3,6-trimethylphenol is somewhat faster. This discovery that these monomer possess the capability of being polymerizable was entirely unexpected in the light of conventional understanding which held that in the case of the oxidative coupling of phenols there would be a great change in polymerizability when there was a change in the substituent of the monomeric phenols. Again, the results can be regarded as being truly surprising when the fact that 2,3,4,6-tetramethylphenol does not set up an oxidative coupling reaction at all is taken into consideration. Further, since the resulting copolymer exhibits excellent properties, this finding is extremely significant.

One of the features of the polyphenylene ether copolymer of this invention is the fact that it is a random copolymer. This can be appreciated by those skilled in the art from the fact that 2,3,6-trimethylphenol demonstrates substantially the same polymerizability as that of 2,6-dimethylphenol in the oxidative coupling reaction and also the fact that in the process during which the oligopolyphenylene ether as an intermediate of the polymer forming reaction by means of oxidative coupling grows into a polymer, the overall polymerization speed constant remains constant irregardless of the class of the foregoing oligopolyphenylene ether. In addition, that the polyphenylene ether copolymer of this invention is a random polymer was confirmed by us by employment of the various analytical methods such as the nuclear magnetic resonance absorption spectrum analysis, mass spectrometry, gas chromatography and gel-permeation chromatography.

The new polyphenylene ether copolymer of this invention is further characterized by its great rigidity as well as superior heat resistance and resistance to solvents. A high degree of improvement in its heat resistance is noted in the case of the copolymer of this invention as compared with the conventional polyphenylene ether, for example, poly(2,6-dimethyl-1,4-phenylene) ether and the copolymer containing the 2,6-dimethyl-1,4-phenylene ether unit and 2,6-dibromo-1,4-phenylene ether unit.

The polyphenylene ether copolymer of this invention is obtained by the method to be hereinafter described. In general, the oxidative coupling reaction of 2,6-dimethylphenol with 2,3,6-trimethylphenol is carried out by passing an oxygen-containing gas through a solution of the catalyst and monomeric phenols in a solvent. As catalyst, those known hitherto as being a catalyst for the oxidative coupling of monomeric phenols can be used, i.e., there is no particular restriction as long as it is one consisting of a transition metal-containing compound and can transform the phenols to phenoxy radicals resulting from the one-electron oxidation of the phenoxy anions followed by coupling these to thus derive the polyphenylene ether from the phenols. Specifically, the catalyst used is one which is composed of a combination of a metal-containing compound selected from the group consisting of the copper-containing compounds, manganese-containing compounds and cobalt-containing compounds with an amine selected from the group consisting of the primary, secondary and tertiary amines. If desired, a basic substance other than the amines such as an alkali metal hydroxide, alcoholate or phenolate may be substituted for the aforesaid amines. The foregoing metal-containing compounds are preferably an inorganic compound such as a salt, oxide or hydroxide. However, it may also be an organic compound such a carboxylate. On the other hand, the foregoing amines may be a monoamine or a polyamine, above all a diamine. The diamine is preferably a tertiary diamine. Of these combined catalysts, those composed of a combination of a copper-containing compound and an amine is especially to be preferred. One reason for this preference is that in the case of the combined catalyst using the manganese-containing compound or the cobalt-containing compound, due to its somewhat lower activity as compared with the copper-containing compound, there are at times when the proportion charged of the monomeric phenols does not agree with the composition of the resulting copolymer in preparing the copolymer of this invention.

As other catalysts that can be used in the process of this invention, there can be mentioned the cobalt-containing chelate complex containing the amine as a ligand and the noble metals such as palladium and platinum.

The proportion in which the metal component in the catalyst is used relative to the monomeric phenols or the proportion of the amine or other basic substances relative to the metal component need not be critical so far as the preparation of the copolymer of this invention is concerned, and any of the proportions used in the art can be employed. While the activity of the catalyst and the amount of the hereinafter-described solvent should be considered in preparing the copolymer of this invention, these can be freely chosen in accordance with the requirements of the intended copolymer.

As hereinbefore described, the combination of a copper-containing compound with an amine is conveniently used in the process for preparing the copolymer of this invention, but it is known that the addition to this combined catalyst of iodine or an iodine compound as a third component is effective (disclosed in copending U.S. Ser. Nos. 445,042 and 445,762 which are assigned to the assignee of the present invention). The foregoing third component demonstrates especially effective action in the case of a catalyst composed of a combination of a copper-containing compound with an amine, in which the catalytic activity is relatively low. As examples of the iodine compounds, included are hydrogen iodide and the salts of hydrogen iodide such as potassium iodide, sodium iodide, ammonium iodide and zinc iodide or the alkyl iodides having 1 – 4 carbon atoms. As a modification of the mode of adding iodine or an iodine compound, the combination of cuprous iodide with either a primary or secondary amine is used with still greater convenience. When a catalyst composed of a combination of a copper-containing compound, an amine and either iodine or an iodine compound is used in preparing the copolymer of this invention, the copper-containing compound is used in an amount in the range of 0.1–100% by weight based on the starting phenols, the amine is used in an amount at least equimolar to the metal-containing compound, and the iodine or iodine compound is used in an amount ranging 0.1–1.0 mole per mole of the metal-containing compound. When a catalyst containing in combination iodine or an iodine compound is used, the catalytic activity is high. Hence, the preparation of a random copolymer in which the proportion of the monomeric phenols charged and the composition of the product are in agreement can be achieved with a much shorter reaction time.

While pure oxygen or air is usually used as the oxygen source to be introduced into the copolymerization reaction system, also usable are those compounds which are capable of liberating oxygen in the reaction system.

The polymerization reaction is best carried out in a solvent. As convenient solvents, mention can be made of such aromatic hydrocarbons as, for example, benzene, toluene, xylene, ethylbenzene, styrene, mesitylene, chlorobenzene and o-dichlorobenzene, and such aliphatic halogenated hydrocarbons as, for example, dichloromethane, trichloromethane and trichloroethylene. A reaction temperature of 20°–100° C., and preferably 25°–55° C., is used.

In the process for preparing the copolymer of this invention the monomer ratio of 2,6-dimethylphenol to 2,3,6-trimethylphenol in the copolymer can be freely chosen, since the polymerizabilities of the two monomers are substantially the same. However, as hereinafter described, in those cases where the 2,3,6-trimethylphenol accounts for a major proportion of the composition, the solubility of the copolymer becomes extremely poor. For example, when the proportion of the 2,3,6-trimethylphenol portion in the composition of the copolymer becomes high, the solubility of the polyphenylene ether copolymer of this invention in benzene, toluene and chloroform, good solvents for poly(2,6-dimethyl-1,4-phenylene) ether, declines, and the low molecular weight copolymer precipitates into the reaction solution. For preparing a copolymer of high molecular weight, the polymerization reaction is best carried out in a homogeneous solution system until the desired copolymer is formed. Hence, 2,3,6-trimethylphenol preferably should account for no more than 50 mol% of the mixture composition of the monomeric phenols in the process for preparing the copolymers of this invention. When the composition is within this range, there is no precipitation into the reaction solution of the producing copolymer at the low molecular weight regions. On the other hand, 2,3,6-trimethylphenol must account for at least 2 mol% of the copolymer for demonstrating its characteristics. Accordingly, the copolymer of this invention has in accordance with the aforementioned range of the mixture composition of the monomeric phenols, a polyphenylene ether copolymeric structure composed of 50–98 mol% of the phenylene ether units derived from 2,6-dimethylphenol

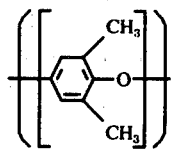

and 2–50 mol% of the phenylene ether units derived from 2,3,6-trimethylphenol

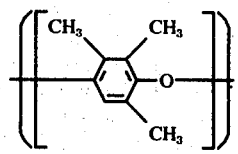

When considering the various characteristics that are demonstrated by the copolymer, the polyphenylene ether copolymer having a polymer structure composed of 5–20 mol% of the 2,3,6-trimethyl-1,4-phenylene ether units may much preferably be used. The polyphenylene ether copolymer of this invention obtained in this manner has an intrinsic viscosity as measured in chloroform at 25° C. of at least 0.3 dl/g, and more preferably 0.40–0.65 dl/g.

Although the so obtained polyphenylene ether copolymer of this invention is a random copolymer containing the units derived from 2,6-dimethylphenol and the units derived from 2,3,6-trimethylphenol, it is characterized by its superior heat resistance as evidence by a much higher softening temperature as compared with the conventional homopolymers of 2,6-dimethylphenol, as well as such excellent resistance to solvents as not seen in the known homopolymer. The softening temperature and resistance to solvents gradually rise in proportion as the amount of the structural units derived from 2,3,6-trimethylphenol portion contained in the copolymeric composition increases.

That the copolymer of this invention demonstrates superior resistance to solvents can be seen from the results of the following experiment. Copolymers whose intrinsic viscosity as measured in chloroform at 25° C. is about 0.5 dl/g and whose content of the 2,3,6-trimethyl-1,4-phenylene ether units corresponds to 5, 10 and 20 mol% are prepared. The resulting copolymers are formed into films by the compression molding method to obtain the test pieces. In a similar manner test pieces are prepared from a homopolymer of 2,6-dimethylphenol having an intrinsic viscosity of about 0.5 dl/g. These test pieces are dipped for a prescribed period of time at room temperature in the various solvents indicated in the following table. After completion of the dipping, the weight losses of the test pieces are measured. The rate of weight loss is shown in the table.

Table

| Solvent | | Rate of Weight Loss Resulting From Dipping % | | |
|---|---|---|---|---|
| Dipping Time Hr(s.) | | Toluene 5 | Dichloroethane 5 | Chlorobenzene 1 |
| Co- poly- mer | Ratio of 2,3,6-Units 5 mol% | 22 | 16 | 52 |
| | Ratio of 2,3,6-Units 10 mol% | 7 | 11 | 22 |
| | Ratio of 2,3,6-Units 20 mol% | 3 | 0 | 0 |
| Homopolymer | | 57 | 23 | 75 |

As is apparent from the results shown in the table, the copolymer of this invention is characterized by its excellent resistance to solvents. Thus, there is no doubt that it is extremely useful for use as engineering plastics.

The superior properties possessed by the polyphenylene ether copolymer of this invention, i.e., its excellent heat resistance, resistance to solvents and mechanical strength, are not only useful when this copolymer itself is used for films and shaped articles, but also when it is used as a mixture with other classes of resins, especially the case where it is used as a mixture with the polystyrene resins. That is, the heat resistance which had been sacrificed heretofore in the case of the mixture of poly(2,6-dimethyl-1,4-phenylene) ether with a polystyrene resin can be maintained at a high level by the use of the copolymer of this invention. Furthermore, the resistance to solvents of the conventional compositions can be improved. Such a resinous composition is useful in providing a high grade molding material and is thus of practical value. This possibility enhances the significance of the present invention.

That the copolymer of this invention is a copolymer obtained by the oxidative coupling of 2,6-dimethylphenol with 2,3,6-trimethylphenol and that it has a random polymer structure have been confirmed, as described in the examples, by infrared absorption spectrum, nuclear magnetic resonance spectrum and mass spectrum analyses as well as the various chromatographical analysis methods and its solubility in methylene chloride or chloroform. Further, its copolymeric composition can be confirmed readily and accurately from its nuclear magnetic resonance spectrum.

The following reference experiments and examples will serve to illustrate the invention more fully.

REFERENCE EXPERIMENT 1

The inside of a reaction vessel equipped with an agitator and connected with a constant pressure oxygen absorption apparatus was purged with oxygen, after which 1.0 part by weight of 2,3,6-trimethylphenol was added followed by the addition of 35 parts by volume of toluene. The temperature of the contents was then brought to 25° C. To this were then added 0.03 part by weight of cuprous iodide and 3.6 parts by weight of n-butylamine as a catalyst, after which the reaction was initiated. When oxygen was fed to the reaction system from a gas burette under normal atmospheric pressure at such a rate as to match the speed of oxidation, the absorption of oxygen ceased in about 4 minutes, and a solid started to precipitate.

The reaction mixture was then introduced into 500 parts by volume of methanol containing hydrochloric acid, following which the solid was filtered off, washed well in methanol and dried for 24 hours at 90° C. to obtain a white powder at a yield of 98.5%. That this powder was poly(2,3,6-trimethyl-1,4-phenylene) ether was confirmed by the fact that the absorptions based on the ether bonds appeared in its infrared absorption spectrum at 1200 and 1100 cm$^{-1}$ and the fact that its spectrum agreed well with that of poly(2,6-dimethyl-1,4-phenylene) ether.

The so obtained polymer was practically insoluble in solvents. In the foregoing polymerization reaction the product precipitates as a solid as the polymer forms. Hence, it cannot grow into a product having a high degree of polymerization, and thus its softening point is low.

REFERENCE EXPERIMENT 2

Two oxygen-purged reactors equipped with an agitator were separately added with 2,6-dimethylphenol and 2,3,6-trimethylphenol in amounts corresponding to 0.04 mol, following which 50 grams of toluene was added. After bringing the temperature of the contents to 40° C., each reactor was added with a priorly prepared catalyst solution containing 0.02 gram of cuprous iodide and 2.4 grams of n-butylamine. The reaction was initiated while passing oxygen into the reaction system. When the oxygen absorption speed during the process of forming the oligopolyphenylene ether by the oxidative coupling reaction of the monomeric phenols was measured, the ratio of the oxygen absorption speed of 2,3,6-trimethylphenol to that of 2,6-dimethylphenol was 1.46. In the process of forming the oligomer the reactivity of 2,3,6-trimethylphenol is somewhat high, but it can be presumed that the copolymerization reaction of 2,6-dimethylphenol with 2,3,6-trimethylphenol will proceed fully satisfactory.

EXAMPLES 1-5

The oxidative coupling reaction was carried out using a monomeric mixture obtained by substituting 2,6-dimethylphenol in the proportion indicated in Table 1 for 2,3,6-trimethylphenol according to Reference Experiment 1.

In Examples 1,2 and 3 a solid was precipitated simultaneously with the conclusion of the absorption of oxygen as in Reference Experiment 1.

The results obtained are shown in Table 1, below.

Table 1

| Example No. | 2,3,6-Trimethyl-phenol (wt. pt.) | 2,6-Dimethyl-phenol (wt. pt.) | Mole Ratio 2,6-Configuration/2,3,6-Configuration | Oxidation Reaction Time (min.) | Total Reaction Time (min.) | Yield (%) | Intrinsic Viscosity (dl/g) | Solubility* (%) |
|---|---|---|---|---|---|---|---|---|
| 1 | 0.53 | 0.47 | 1 | 5 | 5 | 95.3 | 0.25 | 14 |
| 2 | 0.36 | 0.64 | 2 | 6 | 6 | 96.0 | 0.31 | 50 |
| 3 | 0.28 | 0.72 | 3 | 6 | 6 | 96.0 | 0.42 | 100 |
| 4 | 0.22 | 0.78 | 4 | 6 | 16 | 96.9 | 0.50 | above 100 |
| 5 | 0.11 | 0.89 | 9 | 6 | 16 | 94.8 | 0.55 | above 100 |

*Solubility: Amount dissolved when 0.1 gram of sample is dissolved in 10 milliliters of chloroform at 25° C., indicated as percentage.

That the products obtained in the several Examples are polyphenylene ether type copolymers can be concluded from the following facts.

1. The infrared absorption spectrum consists of the spectrum of poly(2,6-dimethyl-1,4-phenylene) ether and the spectrum of poly(2,3,6-trimethyl-1,4-phenylene) ether. In other words, there appears at 960 cm$^{-1}$ the absorption based on the bending vibration of methyl group as seen in the homopolymer of 2,6-dimethylphenol, at 1080 cm$^{-1}$ the absorption based on the symmetric stretching vibration as seen in the homopolymer of 2,3,6-trimethylphenol, and further at 1020 cm$^{-1}$ the absorption based on the deformation vibration of the methyl group of the 2,3,6-configuration superposed on the symmetric stretching vibration of the ether of the 2,6-configuration. Thus, from the fact that these characteristic absorptions appear, it can be seen that the product has a copolymeric structure.

2. As apparent from the solubilities in chloroform of the products obtained in the several Examples, which have been shown together in Table 1, the solubility behavior differs from the case where the products is a mixture of the homopolymers of the two monomers.

3. When the homopolymer of 2,3,6-trimethylphenol obtained in Reference Experiment 1 and the copolymer obtained in Example 5 were submitted to the Soxhlet extraction using as solvent chloroform, a good solvent for poly(2,6-dimethyl-1,4-phenylene) ether, it was substantially impossible to extract the former, whereas the latter could be extracted completely.

4. When the nuclear magnetic resonance spectrum of the copolymer obtained in Example 5 was measured, the spectrum based on the methyl group of the 3-position of the 2,3,6-trimethylphenylene ether skeleton was confirmed. When the ratio of the number of side chain methyl protons to the number of protons of the benzene ring was then obtained from the foregoing spectrum, the value found was 3.31 as against the calculated value of 3.32. Thus, the proportion charged of monomers and the composition of the copolymer obtained are in agreement.

5. When the copolymers obtained in the several Examples were dissolved in methylene chloride, perfect solutions were obtained without any formation of precipitates in the solution. When the homopolymer obtained from 2,6-dimethylphenol is dissolved in methylene chloride, a complex between the homopolymer and the solvent forms and precipitation takes place. Further, when the fact that the homopolymer of 2,3,6-trimethylphenol does not dissolve in methylene chloride is taken into consideration, it can be seen that the copolymers obtained in the several Examples do not contain either of these homopolymers.

EXAMPLE 6

488 parts by weight of 2,6-dimethylphenol, 54 parts by weight of 2,3,6-trimethylphenol, 3 parts by weight of cuprous iodide and 350 parts by weight of n-butylamine were dissolved in 5000 parts by weight of toluene, after which the resulting solution was held at 40° C. The reaction was initiated by blowing in air at a rate of 5000–6000 volume parts per minute with stirring.

When the reaction solution had absorbed oxygen in an amount corresponding to 15% of theory, a part of the reaction solution was taken, and hexamethylsilazane was added thereto. The resulting oligomer whose ends had been silyletherized was then analyzed for its composition by means of gas chromatography, with the result that there were observed in the gas chromatogram four peaks corresponding to the dimer and eight peaks corresponding to the trimer. Hence, it was confirmed that all the theoretically predictable combinations of the dimeric and trimeric 2,6-dimethyl-1,4-phenylene ether units and 2,3,6-trimethyl-1,4-phenylene ether units were present in the resulting oligomer.

Next, when the reaction solution had absorbed oxygen in an amount corresponding to 50% of theory, a part of the reaction solution was taken, and the product was isolated by the reprecipitation method using methanol. The precipitated oligomer was then analyzed for its composition by the direct introduction method using a mass spectrometer. Oligomers up to nonamer were observed. And spectra corresponding to the various combinations of the units derived from the two classes of monomers were confirmed for the several oligomers. It was thus found that the resulting oligomers were mixtures of substances composed of randomly arranged units derived from the two classes of monomers.

Further, when the reaction solution had absorbed oxygen in an amount corresponding to 80% of theory, a part of the reaction solution was taken and analyzed for monomers. However, no monomers were present in the reaction solution at all. The polymer obtained at this time had an intrinsic viscosity as measured in chloroform at 25° C. of 0.12 dl/g.

After the reaction solution had absorbed oxygen in an amount corresponding to 100% of theory, an abrupt rise in the viscosity of the reaction solution was noted. It can thus be seen that a high polymer had formed by the oxidative coupling reaction taking place between the aforementioned oligomers.

The reaction was terminated 110 minutes after its initiation, and the polymer was collected from the reaction solution by the reprecipitation method using methanol. The so obtained polymer had an intrinsic viscosity of 0.50 dl/g. When this polymer was dissolved in methylene chloride, such troubles as insolubility of the homopolymer of 2,3,6-trimethylphenol and precipitates due to the formation of a complex between the homopolymer of 2,6-dimethylphenol and methylene chloride were not noted at all. Further, this polymer was then dissolved in toluene, and the resulting solution was developed by gel-permeation chromatography and separately collected into ten section corresponding to the molecular weight distribution. Each of polymers obtained from the sections was then measured for its nuclear magnetic resonance spectrum. It was confirmed that the ratios of the 2,6-dimethyl-1,4-phenylene ether units to the 2,3,6-trimethyl-1,4-phenylene ether units of the polymers of all sections were invariable, though the molecular weight of each of the polymers obtained from the sections was variable according to the molecular weight distribution.

If the foregoing results are summarized, it can be concluded that the high molecular weight polymer obtained in this Example is a perfect copolymer of a polyphenylene ether type derived from 2,6-dimethylphenol and 2,3,6-trimethylphenol and that this copolymer has a polymeric structure in which the 2,6-dimethyl-1,4-phenylene ether units and 2,3,6-trimethyl-1,4-phenylene ether units are arranged at random.

EXAMPLES 7–10

The experiments were operated as in Reference Experiment 1 but using 0.15 part by weight of cuprous iodide, 18 parts by weight of n-butylamine and 250 parts by volume of toluene, and the copolymerization reaction was carried out, using the monomers 2,6-dimethylphenol and 2,3,6-trimethylphenol in a proportion indicated in Table 2.

The intrinsic viscosity as measured in chloroform at 25° C. of the resulting copolymer and the temperature at which the melt flow was initiated ($T_f$ ° C.) are shown together in Table 2.

Table 2

| Example No. | Mole Ratio 2,6-Configuration/2,3,6-Configuration | Total Reaction Time (min) | Yield (%) | Intrinsic Viscosity (dl/g) | $T_f$ (° C.) |
|---|---|---|---|---|---|
| 7 | 10 | 78 | 97.8 | 0.555 | 278 |
| 8 | 20 | 45 | 98.2 | 0.555 | 271 |
| 9 | 30 | 43 | 98.3 | 0.73 | — |
| 10 | 50 | 43 | 97.9 | 0.605 | 280 |

EXAMPLE 11

A polyphenylene ether copolymer having the ratio of 2,6-dimethylphenol to 2,3,6-trimethylphenol of 20 (intrinsic viscosity = 0.535 dl/g) obtained by operating as in Example 8 was prepared into a film by the compression molding method, following which the resulting film was measured for its tensile strength, using test pieces having a length of 5 cm, width of 0.5 cm and thickness of 0.25 mm. The tensile strength was 765 kg/cm$^2$. On the other hand, the tensile strength of a film obtained from poly(2,6-dimethyl-1,4-phenylene) ether (intrinsic viscosity = 0.53 dl/g) prepared from 2,6-dimethylphenol was 740 kg/cm$^2$.

EXAMPLE 12

Copolymers according to the present invention and a homopolymer of 2,6-dimethylphenol having the intrinsic viscosities shown in Table 3 were synthesized, and the softening points of these copolymers and homopolymer were measured by the Vicat method.

Table 3

| Class of Polymer | Copolymer Composition (2,6-Units/2,3,6-Units) Mole Ratio | Vicat Softening Point (° C) Intrinsic Viscosity (dl/g in CHCl$_3$ at 25° C) | | |
|---|---|---|---|---|
| | | 0.4 | 0.5 | 0.54 |
| Copolymer | 4/1 | 208 | 212 | — |
| | 9/1 | 203 | 209.5 | 213 |
| | 19/1 | 200 | — | 211 |
| Homopolymer | 2,6- | 194 | 197 | 202 |

As is apparent from the foregoing table, the copolymers demonstrate a higher softening point than the homopolymer, the softening point being higher in proportion as the ratio of the 2,3,6-trimethylphenol increases.

EXAMPLE 13

4.88 parts by weight of 2,6-dimethylphenol, 0.27 part by weight of 2,3,6-trimethylphenol (2,6-/2,3,6- mole ratio = 20/1), 0.03 part by weight of cuprous iodide and 3.5 parts by weight of n-butylamine were dissolved in 50 parts by weight of toluene, and the reaction was carried out for 100 minutes at 40° C. by blowing air in at the rate of 90–110 volume parts per minute. The solvent entrained by the air was refluxed to the inside of the reactor by means of a condenser. After completion of the reaction, the reaction product was precipitated, filtered, washed and dried in customary manner to obtain at a yield of 99.7% a copolymer having an intrinsic viscosity of 0.53 dl/g resulting from the oxidative coupling of 2,6-dimethylphenol with 2,3,6-trimethylphenol.

The so obtained polymer was dissolved in toluene, and the resulting solution was developed using gel permeation chromatography and separately collected into ten sections. When the nuclear magnetic resonance absorption spectra of each copolymer obtained from the several sections were measured and the ratio of the polymeric units derived from 2,3,6-trimethylphenol was quantitatively analyzed, it was found that the compositional ratios in the case of all the polymers were in agreement within the limits of standard error. The composition of all the copolymers corresponded to the ratio in which the monomeric phenols were charged, and there was no localization of the 2,3,6- units in any one of the copolymers corresponding to the molecular weight distribution.

EXAMPLE 14

Example 13 was repeated, except that the reaction was terminated after 80 minutes of operation. The reaction product was then precipitated, filtered, washed and dried in customary manner to obtain a copolymer at a yield of 95%. The intrinsic viscosity of this copolymer as measured in chloroform at 25° C. was 0.33 dl/g. On measurement of the molecular weight of the copolymer, it was found to have a number average molecular weight of 9000 and a weight average molecular weight of 26,000. When test pieces were formed from this low molecular weight copolymer and its softening point was measured, it was a high value of 196° C. The various mechanical properties were also possessed to an extent that could stand comparison with the high molecular weight copolymers. In contrast, a homopolymer of 2,6-dimethylphenol of the same molecular weight has a softening point of only 188° C. Further, this low molecular weight homopolymer demonstrates an excessive decline of more than 50% of the value possessed by the homopolymer of a number average molecular weight of above 14,000 in respect of its mechanical properties, especially its elongation and impact strength. It can thus be seen that the copolymer of this invention is unique even in the case of a polymer of low molecular weight.

EXAMPLE 15

A reactor fitted with a stirrer, an inlet for blowing in oxygen and a reflux condenser was charged with a catalyst prepared from a solution of 0.2 part by weight of manganese chloride in 4 parts by volume of methanol and a solution of 0.32 part by weight of sodium hydroxide in 4 parts by volume of methanol followed by adding thereto 100 parts by volume of nitrobenzene containing 4.88 parts by weight of 2,6-dimethylphenol and 0.574 part by weight of 2,3,6-trimethylphenol and thereafter carrying out the reaction by blowing in oxygen at the rate of 500 volume parts per minute with vigorous stirring. The reaction was terminated 5 hours later, and the reaction mixture was separated by filtration. This was followed by introducing the filtrate into methanol to precipitate a product, which was washed and dried to obtain 3.00 parts by weight of polymer (intrinsic viscosity = 0.13). That this polymer was a copolymer was confirmed by its nuclear magnetic resonance spectrum, and its compositional ratio of 2,6-dimethylphenol to 2,3,6-trimethylphenol was 5:1.

EXAMPLE 16

A reactor fitted with a stirrer, an inlet for blowing in oxygen and a reflux condenser was charged with 60 parts by weight of ethylene glycol monomethylether, 20 parts by volume of pyridine and 0.41 part by weight of anhydrous manganese chloride, followed by introducing oxygen at the rate of 500 volume parts per minute. To this system were then added 3.66 parts by weight of 2,6-dimethylphenol and 0.411 part by weight of 2,3,6-trimethylphenol (2,6-/2,3,6- mole ratio = 10/1), after which this system was vigorously stirred for 7 hours while holding it at 50° C. After completion of the reaction, the reaction mixture was introduced into methanol to precipitate a product, which was separated by filtration, washed thoroughly with methanol and thereafter dried for 24 hours at 90° C. to obtain at a yield of 53% a polymer having an intrinsic viscosity of 1.2. That this was a copolymer could be confirmed from the ratio of the number of protons of the side chain methyl to the number of protons of the benzene ring (which ratio was 3.67:1) which was determined by its nuclear magnetic resonance spectrum. This value shows that the compositional ratio of 2,6-dimethylphenol to 2,3,6-trimethylphenol is 4:1.

EXAMPLE 17

A reactor fitted with a stirrer, an inlet for blowing in oxygen and a reflux condenser was charged with a solution of 1.1 parts by weight of sodium hydroxide in 25 parts by volume of methanol, 1.2 parts by weight of 8-hydroxyquinoline and 1.03 parts by weight of cobalt acetate, following which oxygen was passed through at the rate of 500 volume parts per minute. To this system was then added a solution of 4.88 parts by weight of 2,6-dimethylphenol and 0.57 part by weight of 2,3,6-trimethylphenol (2,6-/2,3,6- mole ratio = 10/1) in 100 parts by volume of benzene, after which the reaction was carried out for 8 hours at 30° C. After completion of the reaction, the reaction mixture was introduced into methanol containing hydrochloric acid to precipitate a product, which was filtrably separated, washed with methanol and then dried for 24 hours at 90° C., whereupon was obtained 3.68 parts by weight of polymer (intrinsic viscosity = 2.0). That this polymer was a copolymer was confirmed from its nuclear magnetic resonance absorption spectrum, and it was seen that the compositional ratio of 2,6-dimethylphenol to 2,3,6-trimethylphenol in the copolymer was 7:1.

We claim:

1. A polyphenylene ether random copolymer excelling in heat resistance and resistance to solvents, said copolymer being composed of 50–98 mol% of a structural unit of the formula

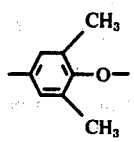

derived from 2,6-dimethyl phenol and 50–2 mol% of a structural unit of the formula

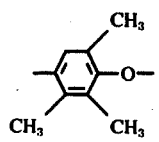

derived from 2,3,6-trimethylphenol, each of said structural units being randomly arranged in the polymeric structure, said copolymer having an intrinsic viscosity, as measured in chloroform at 25° C., of at least 0.3 dl/g.

2. A copolymer of claim 1 having a Vicat softening temperature of at least 200° C. composed of 80–95 mol% of said structural unit of the formula

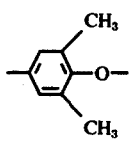

and 5–20 mol% of said structural unit of the formula

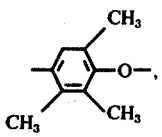

said copolymer having an intrinsic viscosity, as measured in chloroform at 25° C., of 0.40 to 0.65 dl/g.

3. A process for preparing a polyphenylene ether copolymer having a polymeric structure in which are arranged at random a structural unit of the formula

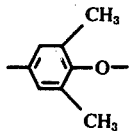

and a structural unit of the formula

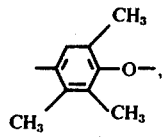

said process comprising carrying out the oxidative coupling of a monomeric phenol mixture consisting of 50–98 mol% of 2,6-dimethylphenol and 2–50 mol% of 2,3,6-trimethylphenol in solution in a solvent capable of dissolving said monomeric phenols, at a temperature of 20°–100° C. in the presence of a combined catalyst composed of a metal-containing compound selected from the group consisting of the copper, manganese and cobalt compounds and an amine compound selected from the group consisting of primary, secondary and tertiary amines, while passing an oxygen-containing gas through said solution.

4. The process of claim 3 wherein said amine compound is a monoamine.

5. The process of claim 3 wherein said amine compound is a tertiary diamine.

6. A process for preparing a polyphenylene ether copolymer having a polymeric structure in which are arranged at random a structural unit of the formula

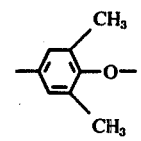

and a structural unit of the formula

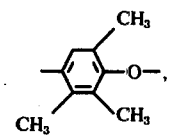

said process comprising carrying out the oxidative coupling of a monomeric phenol mixture consisting of 50–98 mol% of 2,6-dimethylphenol and 2–50 mol% of 2,3,6-trimethylphenol in solution in a solvent capable of dissolving said monomeric phenols, at a temperature of 20°–100° C. in the presence of a combined catalyst composed of a copper-containing compound and an amine compound selected from the group consisting of primary, secondary and tertiary amines, while passing an oxygen-containing gas through said solution.

7. The process of claim 6 wherein said amine compound is a monoamine.

8. The process of claim 6 wherein said amine compound is a tertiary diamine.

9. A process for preparing a polyphenylene ether copolymer having a polymeric structure in which are arranged at random a structural unit of the formula

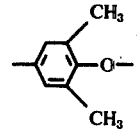

and a structural unit of the formula

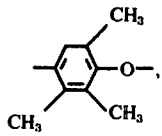

said process comprising carrying out the oxidative coupling of a monomeric phenol mixture consisting of 50–98 mol% of 2,6-dimethylphenol and 2–50 mol% of 2,3,6-trimethylphenol in solution in a solvent capable of dissolving said monomeric phenols, at a temperature of 20°–100° C. in the presence of a combined catalyst composed of a copper-containing compound and an amine compound selected from the group consisting of primary, secondary and tertiary amines, and, in addition, a member selected from the group consisting of iodine and iodides, while passing an oxygen-containing gas through said solution.

10. The process of claim 9 wherein said amine compound is an amine of the group consisting of primary and secondary monoamines.

11. The process of claim 9 wherein said amine compound is a tertiary diamine.

12. The process of claim 9 wherein said copper-containing compound is cuprous iodide and said amine compound is an amine of the group consisting of primary and secondary monoamines.

* * * * *